Figure 1:
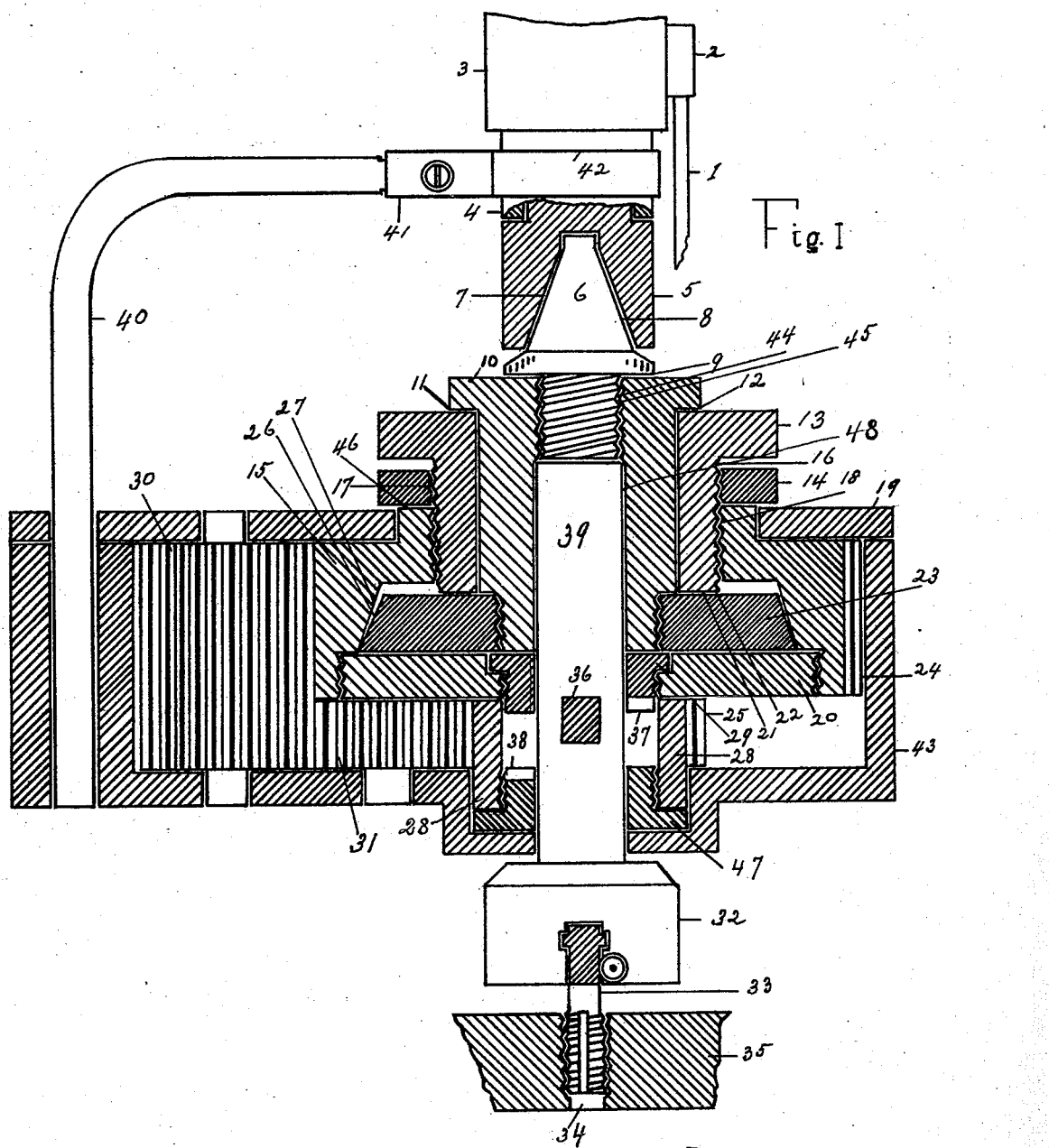

(No Model.) 3 Sheets—Sheet 2.

F. A. ERRINGTON.
AUTOMATIC FRICTION TAPPING ATTACHMENT.

No. 578,483. Patented Mar. 9, 1897.

Witnesses James D. Macpherson, Bernard Bogert

F. A. Errington, Inventor (No Model.)  
3 Sheets—Sheet 3.

F. A. ERRINGTON.
AUTOMATIC FRICTION TAPPING ATTACHMENT.

No. 578,483.  
Patented Mar. 9, 1897.

Witnesses  
James D. Macpherson  
Bernard O. Bogert

F. A. Errington, Inventor

UNITED STATES PATENT OFFICE.

FRANKLIN A. ERRINGTON, OF EDGEWATER, NEW YORK.

AUTOMATIC FRICTION TAPPING ATTACHMENT.

SPECIFICATION forming part of Letters Patent No. 578,483, dated March 9, 1897.

Application filed July 21, 1894. Serial No. 518,251. (No model.)

*To all whom it may concern:*

Be it known that I, FRANKLIN ALFRED ERRINGTON, a citizen of the United States, and a resident of the village of Edgewater, (post-office, Stapleton,) county of Richmond, and State of New York, have invented certain new and useful Improvements in Automatic Friction Tapping Attachments, as set forth in the following specification and shown in the drawings forming part hereof.

My invention relates, broadly, to means for adjustably connecting a friction driving-disk with a gear-wheel or similar driven disk or part, the mechanism being so arranged that the frictional contact between said friction driving-disk and said driven wheel or disk can be adjusted without changing the relative position of the latter with its bearings and in the case of a gear-wheel without interfering with the free action of its gear-teeth.

In the device illustrated in the accompanying drawings I have shown my invention as applied to a reverse-driving mechanism adapted to drive a spindle or the like in opposite directions, said spindle being shown provided with a gripping device or chuck for grasping a drill, tap, or similar cutting-tool, the object of my improvements being to drive the spindle by friction in the cutting or working direction, thereby preventing the breakage of tools or other parts where the power is applied by adjusting the tension of the friction to a degree that while the parts will perform the duty expected of them under normal conditions, yet at any undue strain the frictional surfaces will slip over each other, thereby allowing the working parts to cease revolving before the strain is sufficient to cause breakage, although the driving parts may continue to revolve.

To these ends the invention consists in the novel details of improvements and the combination of parts that will be more fully hereinafter set forth, and then pointed out in the claims.

Reference is to be had to the accompanying drawings, forming part hereof, wherein—

Figure 2:
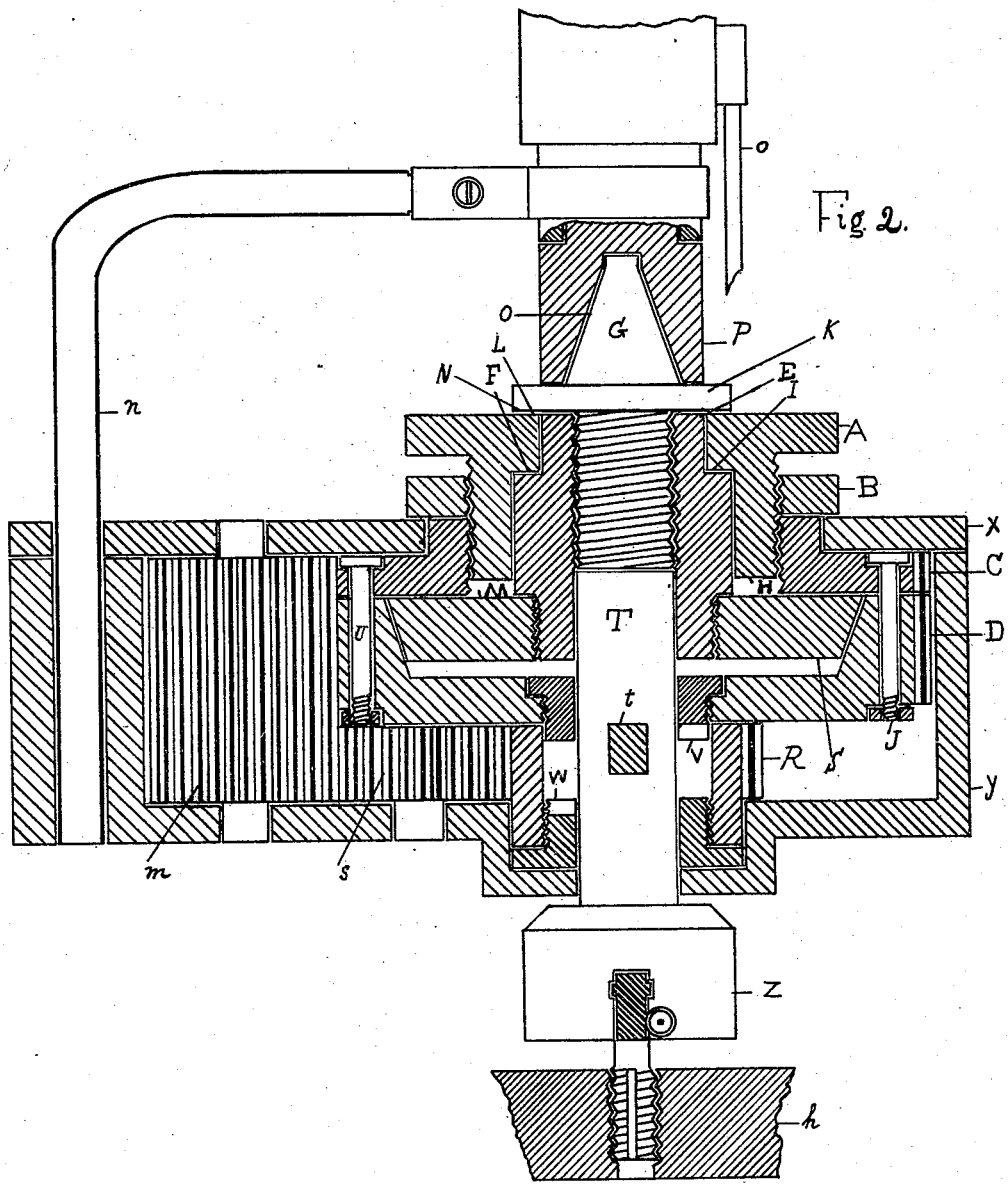
Figure 3:
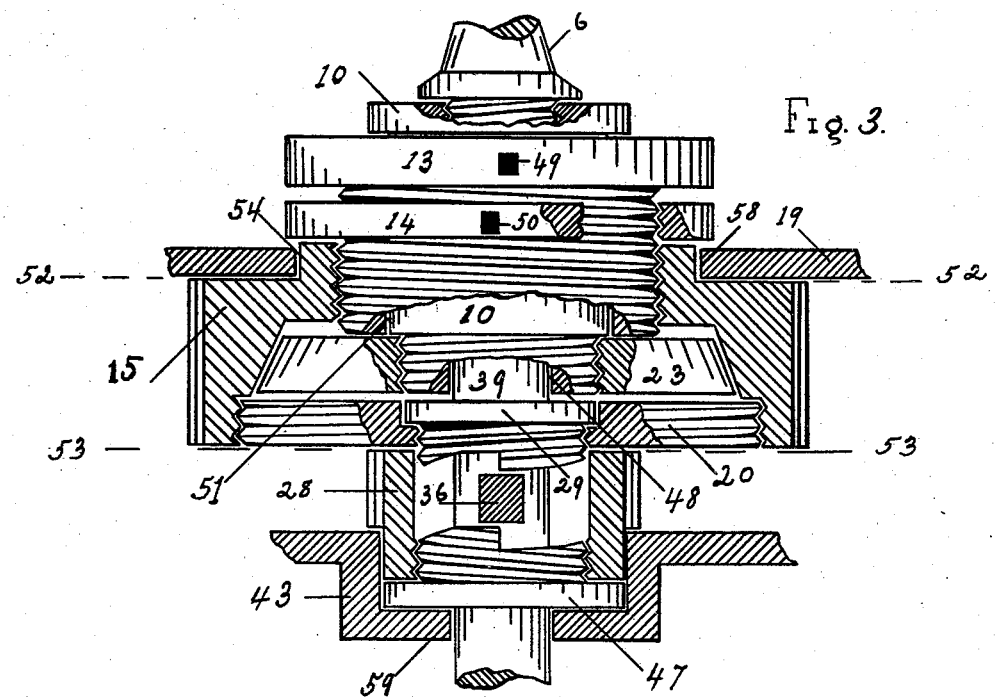
Figure 4:
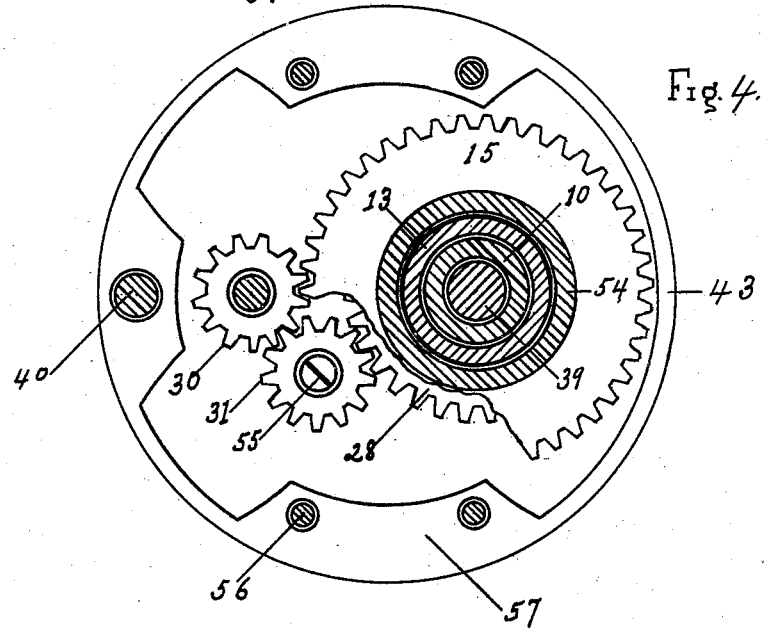

Figure 1 is a vertical cross-section of a machine constructed in accordance with my invention, showing the driven gear-wheel adapted to have frictional contact with the driving friction-disk by screwing the adjusting-ring out of said gear-wheel; and Fig. 2 is a similar view showing the same result by screwing the adjusting-ring into said gear-wheel and also showing a few of the many variations of construction that may be employed to gain the results herein contemplated. Fig. 3 is an elevation, partly in section, of the parts affording frictional adjustment and of the driving and reversing clutch mechanism; and Fig. 4 shows the contents of the case 43 with the cover 19 removed, and a horizontal cross-sectional view of the hub 54, the adjusting-ring 13, the connecting-spindle or bearing-piece 10, and the spindle 39 at the plane of the dotted line 52 of Fig. 3.

The means for revolving the wheels 15 and 28 in opposite directions may be by any arrangement of gearing for that purpose, although the gear-train shown is believed to be the most economical and effective for this purpose.

5 is the longitudinally-movable rotative spindle of a drill-press or similar machine, having a tapered socket 7.

The longitudinally-movable non-rotary sleeve 4 passes through the bearing-piece 3 of the drill-press, and may be raised and lowered through the medium of the lever 1 by any of the various means usually employed for this purpose in drill-presses or similar tools, whereby upon moving the lever 1 up or down the rotative spindle 5 and my device thereto attached will be raised and lowered for the purpose of presenting or withdrawing the tool or tap 34 to or from the work 35, as hereinafter described.

The tapered shank 6 is inserted in the tapered socket 7 of the machine-spindle 5, the other end being shown screwed into the hub or spindle 10 by external threads 44 meshing with internal threads 45, the friction driving-disk 23 being similarly attached to said connecting-spindle, although it is obvious that if desired said disk could be directly attached to the drill-spindle 5 without the intermediate means above mentioned, they being desirable to render the device detachable.

In Fig. 1 the gear-wheel 15 20 is shown composed of two parts in order to permit the friction-disk 23 being placed within said wheel. The disk 15 is shown having a screw-threaded centrally-located bore for connection with adjusting-ring 13, an inner surface for frictional contact with disk 23, and gear-teeth 24. The disk 20 is shown carrying clutch-sleeve 29, having a clutch formation or tooth 37 on its inner face and as screw-threaded to part 15, although this part might be omitted entirely if it was merely desired to use the frictional-driven wheel 15 through its gear-teeth 24. The construction of these parts may be greatly varied without departing from the spirit of my invention. In Fig. 2 part C is shown provided with a centrally-located screw-threaded bore, being attached to wheel D by bolts J, or the gear-teeth may be omitted entirely from this part, leaving it merely as a connection for wheel D with adjusting-ring A.

The adjusting-ring 13 is shown with external screw-threads 16 to mesh with internal screw-threads 17 in check-nut 14 and with threads 18 in wheel 15, said adjusting-ring being provided with bearing-surfaces 11 and 22, adapted to press against similar surfaces 12 and 21 of hub or spindle 10 and friction driving-disk 23, whereby upon turning adjusting-ring 13 out of wheel 15 the bearing-surface 11 will press against the surface 12 and press wheel 15 against disk 23, the ring 13 being held in position by check-nut 14 being screwed down on surface 46 of wheel 15 when the frictional contact between disk 23 and wheel 15 has been adjusted to the degree desired.

The function of the check-nut, ring, or washer 14 is to cause the adjusting-ring 13 and the friction-driven disk 15 to remain firmly united together in whatever position the adjusting-ring 13 is set, and I have shown the check-nut 14, provided with internal threads 17, as a medium by which it is firmly connected with the part 15 when in operative position; but it is evident that other means than said threads 17 may be employed to connect the check-nut 14 and the friction-driven disk 15 to rotate in unison for the purpose of "checking" or preventing the relative positions of the adjusting-ring 13 and the friction-driven disk 15 with each other from being disturbed by any slipping of the friction-disks.

When it is desired to bring the frictional surfaces of the driving friction-disk and the driven wheel or disk together by turning the adjusting-ring into the wheel, as illustrated in Fig. 2, the surfaces I or H against F or M may be adapted for this purpose, or surfaces 21 and 22, as shown in Fig. 1, may be utilized with the variations of construction suggested in Fig. 2, Figs. 1 and 2 being equivalent constructions, with the difference that the adjusting-ring A in Fig. 2 moves the friction-driven gear-wheel D longitudinally (and the whole device with it, except the driving friction-disk and its hub or spindle) up against the driving friction-disk, while in Fig. 1 the adjusting parts move the friction-driven gear-wheel 15 longitudinally down against the friction driving-disk 23, and when a tapered friction-driven surface is used the female taper is placed on that one of the parts of the wheel that moves longitudinally toward the friction driving-disk. The construction of the parts may be greatly varied, the aim being to secure an exact adjustment of the frictional tension and then lock the parts together to preserve said tension at a constant degree.

The wheel 20 is shown provided with a clutch-sleeve 29, carrying a clutch formation or tooth 37, the longitudinally-movable spindle 39 being journaled in a concentric bore opening on the inner face of the driving friction-disk 23 and extending into said hub or spindle 10. For convenience in manufacture the disk and hub are shown in two pieces, with said bore or spindle bearing in said hub 10; but it may readily be seen that where it is desired to utilize the friction for the purpose of driving a spindle or other part alone the spindle or part could be made integral with wheel or plate 20.

In the application of my invention to a detachable reverse-driving mechanism adapted to be used as an automatic friction tapping attachment, as illustrated in Figs. 1 and 2, the operation is as follows: The device is moved toward work 35 by feeding down the longitudinally-movable non-rotary spindle-sleeve 4 by means of the lever 1, and upon tool 33 meeting the work 35 the spindle 39 is raised until its clutch 36 engages clutch 37. On spindle 5 being rotated, the shank 6 communicates motion to connecting hub or spindle 10, which turns disk 23. The frictional contact of surfaces 26 27 causes wheel 15 to revolve in a direction corresponding to that of friction driving-disk 23, and adjusting-ring 13 and check-nut 14, when screwed tightly together, becoming virtually one piece with wheel 15, turn with it and form a journal or bearing for said wheel upon said hub or spindle 10, assuring the alinement of said wheel with said hub or spindle and permitting said wheel 15 and said driving friction-disk 23 to rotate independently (or, more strictly speaking, said wheel 15 to stand still while said disk 23 continues to rotate) should the tool or working parts meet with undue resistance greater than provided for when regulating the frictional tension between said wheel and said disk. The clutch formation 37 is positively connected to wheel 15 20 and is shown in position for engagement with spindle-clutch formation 36. Gear-teeth 24 mesh with the teeth of "double-depth pinion" 30, which engages "reverse-pinion" 31, which transmits and reverses the motion to wheel 28, carrying clutch formation 47, having tooth 38. The casing 43 furnishes bearings for said mechanism and serves to hold all parts in their relative positions. The spindle 39 is shown provided with a chuck 32, holding a tap 33, the device being illustrated in its working position, the bore 34 in work 35 having been threaded by the tap 33. At this point should spindle 5 cease to feed toward work 35 and still continue to rotate, the tap 33 would still advance into bore 34 until teeth 37 36 were separated thereby, whereupon said tap would automatically cease to rotate. (See Fig. 3.) Upon lever 1 being raised, the tap 33, remaining in the work 35, will hold down spindle 39 until clutch 36 engages reverse-clutch 38, when the tap will be backed out at a greater speed than that with which it revolved when cutting.

It is readily seen that this device could be used in a lathe or other tool where the spindle has no longitudinal movement, in which case the work would be moved to and from the cutting-tool with the same result.

The frictional contact between the disk 23 and wheel 15 may be adjusted to a sufficient degree of tension to drive cutting-tool 33 under normal cutting resistance, and yet should tool 33 strike a chilled spot in work 35, become clogged with chips, or otherwise meet with undue resistance the surfaces 26 27 will slip over each other and tap 33 cease to revolve, thus avoiding all danger of breakage, which would have been the case if tool 33 had been positively driven from spindle 5. It is obvious that the connecting-spindle 10 might be shortened by substituting the bearing-surfaces N of the lips K of shank G for the bearing-surfaces 12, although the greater the length of the bore 48 the better bearing it affords to spindle 39, this being an essential feature in securing the accuracy of the functional result. Likewise the disks 15 and 23 might have the angles of their frictional surfaces 26 and 27 reversed, and then turn adjusting-ring 13 into said wheel, utilizing surfaces 22 and 21 for pressing said wheel 15 against friction-disk 23.

While the interposition of a friction-surface between the driving-spindle and the cutting-tool is not in itself new, yet the means and conditions under which they are employed, as herein set forth, for adjusting the frictional tension, as well as their combination in a reverse-driving mechanism, are believed to be original, while the superior effectiveness obtained by this combination is very material both as a time and labor saver, dispensing with the necessity for a reverse movement to the machine and enabling the operator to control the driving, stopping, and reversing of the tap or other tool from the feed-lever 1 of the machine. The distance between the ends of teeth 37 38 is greater than the length of clutch 36, so that the latter may be placed where it will not engage with either of the former, if desired, thus allowing the spindle 39 to remain stationary, even when the surrounding parts are rotating.

I claim—

1. The combination of a friction-disk having a hub provided with a bearing surface or surfaces adapted to afford longitudinal resistance, another disk surrounding said hub and capable of rotation independent thereof, a screw-threaded adjusting-ring adapted to coact with said bearing surface or surfaces of said hub to move one of said disks longitudinally to adjust the tension of their frictional contact, and a check-nut to hold said adjusting-ring in position when adjusted, substantially as described.

2. The combination of a friction-disk having a hub projecting from its outer face, said parts having a concentric bore opening on their inner face and said hub being provided with a bearing surface or surfaces adapted to afford longitudinal resistance, another disk surrounding said hub and capable of rotation independent thereof, a screw-threaded adjusting-ring adapted to coact with said bearing surface or surfaces of said hub to move one of said disks longitudinally against the other, a check-nut to hold said adjusting-ring in position when adjusted, a spindle socketed in said concentric bore, and means to connect one of said disks with said spindle, substantially as described.

3. The combination of a friction-disk having a hub provided with a bearing surface or surfaces adapted to afford longitudinal resistance, another disk surrounding said hub and capable of rotation independent thereof, a screw-threaded adjusting-ring adapted to coact with said bearing surface or surfaces of said hub to move one of said disks longitudinally against the other, a check-nut to hold said adjusting-ring in position when adjusted, a longitudinally-movable spindle provided with a clutch, one of said disks being provided with a clutch to engage said spindle-clutch to turn said spindle in one direction, and means connected with one of said disks to turn said spindle in the opposite direction, substantially as described.

4. The combination of a driving friction-disk, a friction-driven disk surrounding said driving friction-disk and having a concentric screw-threaded bore, an externally-screw-threaded adjusting-ring independent of said driving friction-disk, located in and meshing with said screw-threaded bore of said friction-driven disk to adjust the tension of the frictional contact of said disks, said ring having a concentric bore to admit means for connecting said driving friction-disk with a rotative driving part, and a check-nut to hold said adjusting-ring in position, substantially as described.

5. The combination of a disk having a hub, a bearing-surface connected with said disk and adapted to afford longitudinal resistance, another disk surrounding said hub and having a centrally-located screw-threaded bore, an externally-screw-threaded adjusting-ring interposed between said last-mentioned disk and said hub to form a bearing for said last-mentioned disk on said hub and adapted to mesh with said screw-threaded bore of said last-mentioned disk and to bear against the bearing-surface connected with said first-mentioned disk to move one of said disks longitudinally against the other, and a check-nut to lock said adjusting-ring in position substantially as described.

6. The combination of a friction-disk, a bearing-surface connected therewith, a wheel composed of two parts, means to connect said parts of said wheel together, one of said parts of said wheel having a centrally-located screw-threaded bore, a screw-threaded adjusting-ring provided with a bearing-surface to bear against said surface of said friction-disk, a check-nut to hold said adjusting-ring in position, a spindle, means connected with the other of said parts of said wheel to turn said spindle in one direction, and means connected with one of said parts of said wheel to turn said spindle in the opposite direction, substantially as described.

New York, N. Y., July 20, 1894.

F. A. ERRINGTON.

Witnesses:
  JAMES D. MACPHERSON,
  BERNARD BOGERT.